United States Patent [19]
Fisher

[11] 3,822,570
[45] July 9, 1974

[54] CONNECTION OF RESILIENTLY DEFORMABLE SEALING MEMBERS TO GENERALLY CYLINDRICAL ARTICLES

[75] Inventor: Leslie George Fisher, Birmingham, England

[73] Assignee: GKN Transmissions Limited, Birmingham, England

[22] Filed: Aug. 14, 1972

[21] Appl. No.: 280,127

[30] Foreign Application Priority Data
Aug. 14, 1971  Great Britain..................... 38236/71

[52] U.S. Cl............................. 64/32 R, 64/8, 64/21, 74/18
[51] Int. Cl................................................ F16d 3/84
[58] Field of Search........ 64/32 F, 32 R, 8, 21, 9 A, 64/6; 74/18, 18.1

[56] References Cited
UNITED STATES PATENTS
3,017,756  1/1962  Sharp................................ 64/32 R
3,106,077  10/1963  Sharp....................................... 64/8
3,343,855  9/1967  Hisen...................................... 74/18
3,611,816  10/1971  Wedekind et al................... 64/32 F
3,714,797  2/1973  Fisher....................................... 64/8

*Primary Examiner*—Samuel Scott
*Assistant Examiner*—Randall Heald
*Attorney, Agent, or Firm*—Spencer & Kaye

[57] ABSTRACT

A universal joint comprising an open-ended outer member, an inner member movable universally therein and coupled thereto by torque transmitting balls, the open end of the outer member being closed by a sealing member of resilient material having a sleeve-like attachment portion embracing the outer member adjacent to its open end and itself embraced externally by a metal sleeve which has a terminal portion projecting axially beyond the attachment portion of the sealing member, with the terminal portion deformed radially inwardly over a ring seated in a circumferential groove in the outer member, so as to interlock the metal sleeve with the outer member and prevent its axial withdrawal therefrom.

3 Claims, 3 Drawing Figures

CONNECTION OF RESILIENTLY DEFORMABLE SEALING MEMBERS TO GENERALLY CYLINDRICAL ARTICLES

BACKGROUND OF THE INVENTION

1. Field of the Invention

This invention relates to the securement of a sealing member of resiliently deformable material to a generally cylindrical member having an open end required to be closed by the sealing member.

The invention has been developed in relation to a universal joint comprising a hollow generally cylindrical outer member open at one end, an inner member movable in and relatively to the outer member angularly in a universal manner, and coupled therewith by torque transmitting elements accommodating such universal movement.

Especially stringent requirements arise as to the closure of the open end of the outer member of a universal joint, in that universal joints intended to be installed in a transmission shaft or drive shafts of automotive vehicles are now normally packed with lubricant to be effective between the engaging surfaces of the inner and outer members of torque transmitting elements for the whole of the service life of the automotive vehicle.

It is thus important that there shall be no leakage of lubricant, despite the fact that such joints intrinsically undergo temperature cycling since some heat is generated each time the joint is brought into operation, and further are required to operate satisfactorily under extremes of temperature and adverse conditions such as snow, ice, water immersion and muddy conditions.

Further, in many cases the design of the inner and outer members of the joint and torque transmitting elements is such as to provide for axial plunge, i.e. relative axial movement between the inner and outer members of the joint, and this movement has to be accommodated by the sealing member without impairment of the effective seal which it provides with respect to the open end of the outer member.

Additionally, when such universal joints are provided in the transmission shaft of an automotive vehicle, a high speed of rotation is often involved, e.g. 6,000 to 7,000 r.p.m., and the centrifugal forces which the sealing member has to withstand, both by virtue of its own mass and by virtue of the pressure exerted centrifugally by lubricant contained in the joint, creates a particularly severe problem in ensuring that there shall be no leakage of lubricant.

2. Description of the Prior Art

Many constructions have heretofore been proposed for securing the sealing member of the joint in axially overlapping relation embracing the outer member of the joint externally but these are either not wholly satisfactory as regards technical performance or else contribute significantly to the manufacturing cost of the joint. Thus one construction comprises a tightenable band but tightening mechanism projects radially and is objectionable in cases where the joint has to be used in a confined space.

SUMMARY OF THE INVENTION

The object of the present invention is to provide a new or improved form of securement means and a method of securement of a sealing member which is better adapted to overcome or reduce the problems referred to than those currently in use.

From one aspect the invention resides in the provision of a universal joint comprising a hollow generally cylindrical outer member open at one end, an inner member movable in and relatively to the outer member angularly in a universal manner, torque transmitting elements coupling said inner and outer members and accommodating said universal movement, a sealing member enclosing said outer end of said outer member and having a sleeve-like attachment portion embracing said outer member externally and secured thereto by a metal sleeve, the improvement wherein said metal sleeve has a terminal portion projecting axially beyond the free end of said sleeve-like attachment portion, interlock means are provided on said outer member of said joint, said terminal portion is shaped in longitudinal diametral cross-section to have interlocking relation with said interlock means to secure said sleeve against axial withdrawal from embracing relation with said attachment portion of said sealing member.

From a further aspect the invention resides in a method of securing a sealing boot or like sealing member with resiliently deformable material at one end of, but in axially interfitting relation with, the outer end of a universal joint wherein the latter is embraced externally by a sleeve-like attachment portion of said sealing member, said method comprising the steps of axially passing a closely fitting deformable metal sleeve over said attachment portion of said sealing member to an extent such that a terminal portion of said metal sleeve projects axially beyond the free end of said attachment portion, subjecting said terminal portion to deformation to establish therefor a longitudinal diametral cross-sectional shape providing an interlocking relation with an interlock means provided on said outer member thereby to prevent axial withdrawal of said metal sleeve.

BRIEF DESCRIPTION OF THE DRAWINGS

The invention, including optional features thereof, will now be described, by way of example, with reference to the accompanying drawings wherein.

DESCRIPTION OF THE PREFERRED EMBODIMENTS

Figure 1:
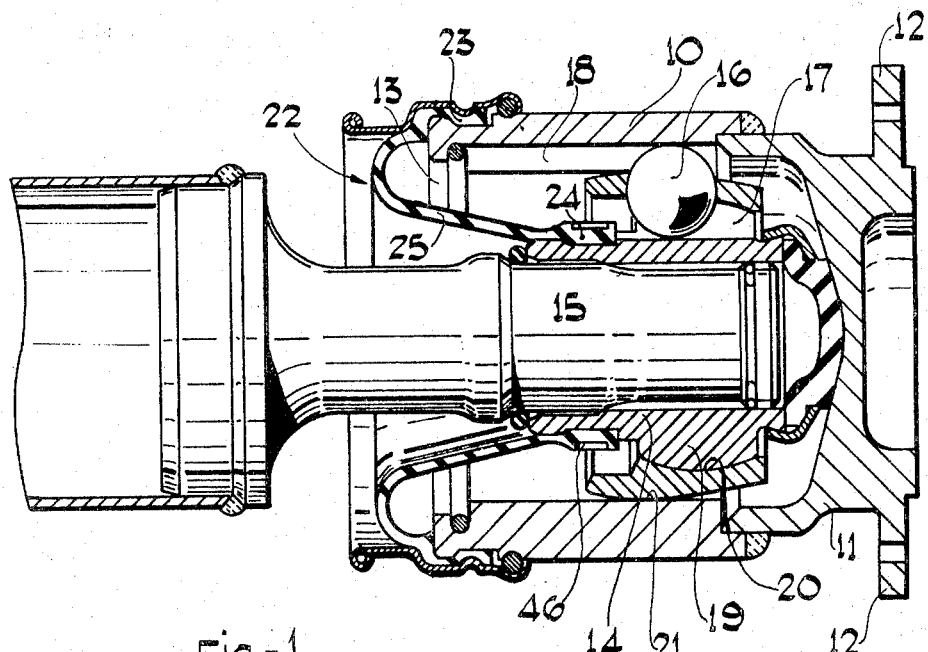
FIG. 1 is a view in side elevation and in diametral cross-section showing one embodiment of the invention applied to a constant velocity axially plunging universal joint.

In the universal joint illustrated in FIG. 1 to which the invention is applied, the joint comprises a generally cylindrical outer member 10 closed at one end by a plate 11 incorporating a coupling flange 12 and having an opening 13 at its other end. In the interior of the outer member is disposed an inner member 14 which is splined internally for engagement with a driving shaft 15 and which is coupled to the outer member by torque transmitting elements in the form of angularly spaced balls 16 engaging in axially extending grooves 17 and 18 in the inner and outer members respectively, these balls being centered to lie constantly in the bisector plane of the joint by a cage 19 having part-spherical surfaces 20 and 21 at its inner and outer sides set off from centres offset symmetrically on opposite sides of the axis of articulation of the joint.

The grooves 18 provide for axial movement or plunge of the inner member relatively to the outer member of the joint.

The opening 13 of the outer member is closed by a sealing boot 22 which incorporates a generally cylindrical axially extending sleeve-like attachment portion 23 externally embracing the outer member 10 of the joint, a generally cylindrical attachment portion 24 externally embracing the inner member 14 of the joint, and an approximately C-shaped connecting portion 25 joining the two attachment portions 23 and 24.

Figure 2:
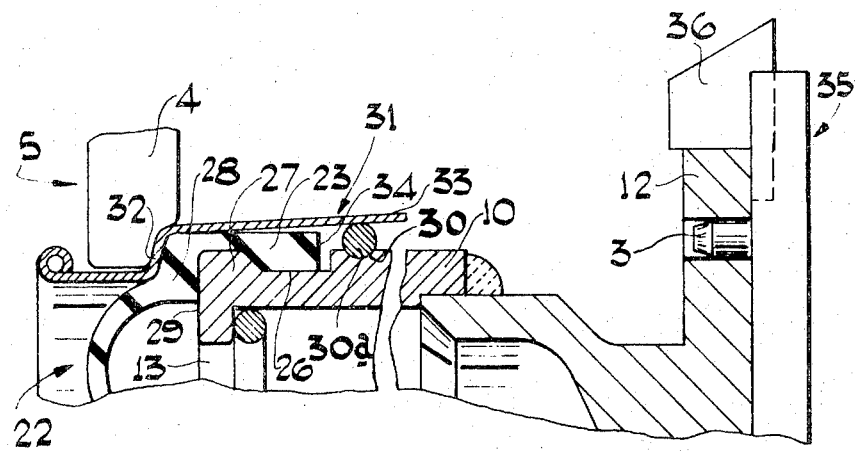
FIG. 2 is a fragmentary view in side elevation showing the first stage of the method of effecting securement of the sealing member of the joint with respect to the outer member.
Figure 3:
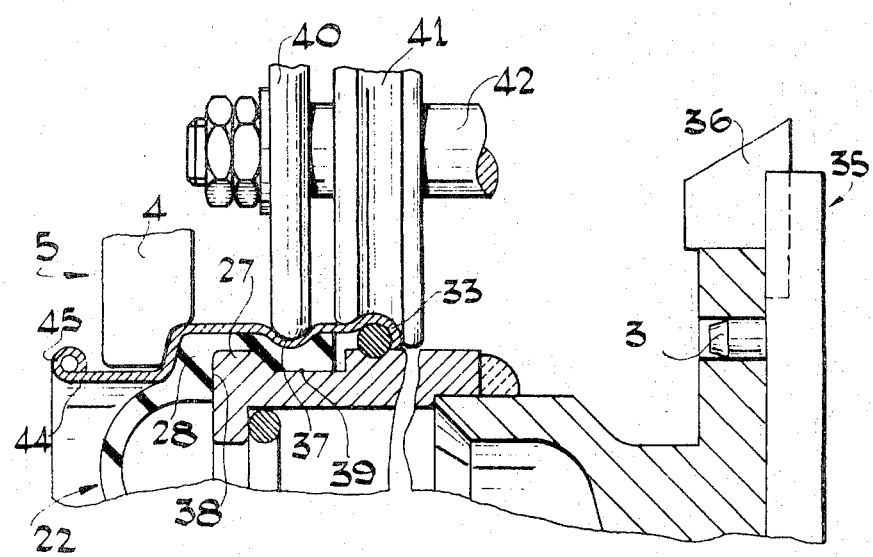
FIG. 3 is a view similar to FIG. 2 showing the second stage of effecting securement.

The present invention is applied to the manner of securing the attachment portion 23 with the outer member of the joint and is best seen in FIGS. 2 and 3.

The outer member 10 of the joint incorporates an outwardly facing channel 26, and between this and the open end of the outer member the latter includes a circumferentially extending external rib 27.

The internal surface of the attachment portion 23 of the sealing member is of at least approximately complementary shape in longitudinal diametral cross-section, but of somewhat smaller size, so that when fitted over the outer member of the joint it embraces same closely. Between the C-shaped connecting portion 25 and the attachment portion 23 the sealing member includes a radially inwardly stepped portion 28, the axially presented shoulder of which engages the end face 29 of the outer member.

The outer member is also formed with an interlock means comprising a circumferentially extending groove 30 of part-circular form in cross-section in which is disposed a ring 30a, preferably of circular cross-section of resilient metal stock, for example steel, which conveniently is split at one position around its circumference to facilitate assembly in the groove, and which ring projects radially from the mouth of the groove and has a diameter such as to project radially to about the same extent as the outer surface of the attachment portion 23 of the sealing member.

Securement is effected by axially passing a deformable metal sleeve 31 over the attachment portion 23 of the sealing member from left to right as viewed in FIG. 2. This sleeve may be made of mild steel and may typically have a wall thickness of 0.04 inches. This sleeve has a radially inwardly stepped portion 32 which engages the portion 28 of the sealing member and enables this portion to be compressed axially between the stepped portion 32 and the end face 29 if desired. The metal sleeve 31 is passed over the attachment portion 23 to an extent such that a terminal portion 33 of the sleeve projects beyond the free end 34 of the attachment portion 23 and overlies the groove and ring 30, 30a with the terminal portion adjacent to or in sliding contact with the crest of the ring 30a.

Such assembly may be effected by engaging the stepped portion 32 of the sleeve with a tool having contractable jaws such as 4, the inner faces of which are shaped in a manner complementary to the outer surface of the stepped portion 32 of the sleeve and which are moved collectively in the direction of the arrow 5.

The diameter of the sleeve 31 is such that it closely embraces the external surface of the attachment portion 23 and may subject this to light radial compression merely by the operation of passing the sleeve over the attachment portion.

The outer member of the joint may be held during this operation against axial movement in any suitable manner, for example by means of a holder 35 having jaws 36 movable radially to engage the edge face of the flange 12 and preferably having dowel pins 3 to pass through holes in the flange 12 provided for the purpose of enabling the flange to be secured to a driven shaft.

During the second stage of securement illustrated in FIG. 3, the stepped portion 28 of the sealing ring, if subjected to precompression in an axial directon, is maintained in this state by continued pressure exerted on the tool incorporating the jaws 4, while the outer member of the joint continues to be gripped by the holder 35.

The terminal portion 33 of the metal sleeve is subjected to deformation to curl the terminal portion radially inwardly behind the ring 30a to engage the axially presented side thereof remote from the opening 13.

Concurrently the sleeve 31 is preferably subjected to local radial inward deformation in a pinch zone to produce a radially inwardly deformed portion 37 at a position in between the free end 34 of the attachment portion 33 and the rib 27.

Inward deformation of the terminal portion 33 serves to retain the inwardly stepped portion 28 in a state of axial compression and thereby maintains particularly effective sealing in a zone 38 of the end face 29 engaged by the shoulder of the portion 28.

Radial compression in the pinch zone so as to maintain particularly effective sealing in the base of the channel 26 over a zone indicated generally at 39.

Consequently any lubricant in the interior of the joint has to traverse two distinct sealing zones in which high contact pressure is established between the sealing member and the outer member of the joint before any leakage could take place.

Deformation in respect of the terminal portion 33 and in respect of the pinch portion 37 is preferably effected by rolling.

For this purpose roller elements 40 and 41 rotatably mounted on a shaft 42 are traversed relatively to the metal sleeve 31 to engage them with circumferentially successive portions of the sleeve and deform same by rolling action.

The shaft 42 may be supported in any convenient manner by an arm (not shown) coupled to a driving dog for rotating the shaft 42 about the axis 43 of the assembly. It will be noted that both roller elements engage the sleeve at the same, or approximately the same, radial position, and consequently any tendency of the sleeve to bow outwardly in the pinch zone in consequence of inward deformation of the terminal portion 33 is completely counteracted by engagement of the sleeve in the pinch zone by the roller element 40.

The sleeve 31 includes a skirt portion 44 projecting axially away from the open end of the outer member and enclosing the generally C-shaped portion 22 of the sealing boot. The skirt portion 44 is stiffened by provision of a bead or channel section 45.

The skirt portion 44 serves to support the C-shaped portion 22 and prevent this undergoing distortion by whirling action when the joint is rotated at high speed and considerable pressures are set up centrifugally from the causes previously mentioned.

It will be noted that the use of a groove 29 and clip or ring 30 contributes to the economy of the construction, in that the radially projecting interlock formation is achieved without employing tubular stock of increased wall thickness to make the outer member of the joint. Further, by virtue of the circumferentially split form of the ring 30, the latter can accommodate itself to variations in diameter of the outer member due to production tolerances.

It is contemplated, however, that instead of utilisation of the ring 30, the terminal portion might be deformed into a somewhat deeper groove to establish an axially interlocking relation between the metal sleeve 31 and the outer member of the joint.

The inner attachment portion 24 is secured to the inner member of the joint in a conventional manner by means of a band-type clip 46.

I claim:

1. In a universal joint comprising a hollow generally cylindrical outer member open at one end, an inner member movable in and relatively to the outer member angularly in a universal manner, torque transmitting elements coupling said inner and outer members and accommodating said universal movement, a sealing member closing said outer end of said outer member and having a sleeve-like attachment portion embracing said outer member externally and secured thereto by a metal sleeve, the improvement wherein:
   a. said metal sleeve has a terminal portion projecting axially beyond the free end of the sleeve-like attachment portion,
   b. interlock means are provided on said outer member of the joint,
   c. said interlock means comprises a circumferentially extending groove in said outer member of said joint and a ring projecting radially from the mouth of said groove.
   d. said cross-sectional shape of said terminal portion of said metal sleeve is such that it includes a part extending radially inwardly in engagement with that side face of said ring which is situated at the side of said ring remote from said open end of said outer member.
   e. said terminal portion is shaped in longitudinal diametral cross-section to have interlocking relation with said ring to secure said sleeve against axial withdrawal from embracing relation with said attachment portion of said sealing member.

2. In a universal joint comprising a hollow generally cylindrical outer member open at one end, an inner member movable in and relatively to the outer member angularly in a universal manner, torque transmitting elements coupling said inner and outer members and accommodating said universal movement, a sealing member closing said outer end of said outer member and having a sleeve-like attachment portion embracing said outer member externally and secured thereto by a metal sleeve, the improvement wherein:
   a. said metal sleeve has a terminal portion projecting axially beyond the free end of said sleeve-like attachment portion,
   b. interlock means are provided on said outer member of said joint,
   c. said terminal portion is shaped in longitudinal diametral cross-section to have interlocking relation with said interlock means to secure said sleeve against axial withdrawal from embracing relation with said attachment portion of said sealing member, joint.
   d. said metal sleeve has a radially inwardly stepped portion adjacent to, but spaced axially from, said open end of said outer member of said joint,
   e. said sealing member has a radially inwardly stepped portion,
   f. said radially inwardly stepped portion of the sealing member is engaged between an end face of said outer member bordering said open end thereof and said radially-inwardly stepped portion of said metal sleeve,
   g. said radially inwardly stepped portion of said sealing member is in a state of axial compression between said end face of said outer member and said radially inwardly stepped portion of said metal sleeve.

3. In a universal joint comprising a hollow generally cylindrical outer member open at one end, an inner member movable in and relatively to the outer member angularly in a universal manner, torque transmitting elements coupling said inner and outer members and accommodating said universal movement, a sealing member closing said outer end of said outer member and having a sleeve-like attachment portion embracing said outer member externally and secured thereto by a metal sleeve, the improvement wherein:
   a. said metal sleeve has a terminal portion projecting axially beyond the free end of said sleeve-like attachment portion,
   b. interlock means are provided on said outer member of said joint,
   c. said terminal portion is shaped in longitudinal diametral cross-section to have interlocking relation with said interlock means to secure said sleeve against axial withdrawal from embracing relation with said attachment portion of said sealing member,
   d. at a position between said open end of said outer member and said free end of said sleeve-like attachment portion of said sealing member, said metal sleeve includes a pinch portion extending circumferentially of said sleeve and which extends radially inwardly of adjacent portion of said metal sleeve to effect radial compression of said attachment portion of said sealing member in a pinch zone situated between said free end of said attachment portion and said open end of said outer member of the joing.

* * * * *